_United States Patent_ [19]

Hama

[11] Patent Number: 4,473,281
[45] Date of Patent: Sep. 25, 1984

[54] COMPENSATING MECHANISM FOR ZOOM LENS

[75] Inventor: Yoshihiro Hama, Tsurugashima, Japan

[73] Assignee: Asahi Kogaku Kogyo Kabushiki Kaisha, Tokyo, Japan

[21] Appl. No.: 300,613

[22] Filed: Sep. 9, 1981

[30] Foreign Application Priority Data

Sep. 11, 1980 [JP] Japan ............................ 55-129965[U]

[51] Int. Cl.³ ................................................ G03B 9/06
[52] U.S. Cl. .................................... 354/271.1; 354/286
[58] Field of Search ................... 354/43, 46, 196, 271, 354/286, 270

[56] References Cited

U.S. PATENT DOCUMENTS 3,997,906 12/1976 Kashiwase .......................... 354/196
4,245,901 1/1981 Karikawa et al. ..................... 354/43

Primary Examiner—Michael L. Gellner
Attorney, Agent, or Firm—Christie, Parker & Hale

[57] ABSTRACT

A zoom lens for a camera having automatic diaphragm control has an element for adjusting the focal distance of the lens, a displaceable actuator, a diaphragm variable between a maximum aperture value and a minimum aperture value responsive to displacement of the actuator, and an element for displacing the actuator upon shutter release. An element maintains the diaphragm at the maximum aperture value during an initial portion of the displacement of the actuator. Another element changes such initial portion responsive to the adjusting element to compensate for changes in lens characteristics as the focal length is adjusted.

4 Claims, 2 Drawing Figures

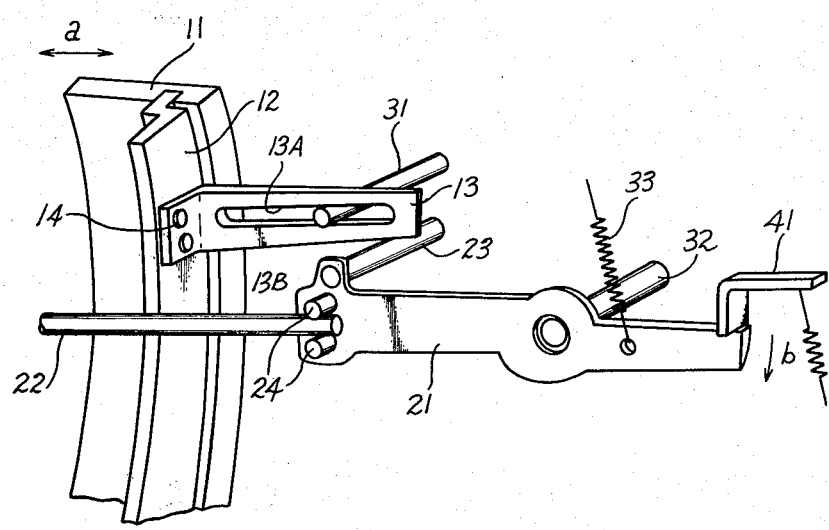

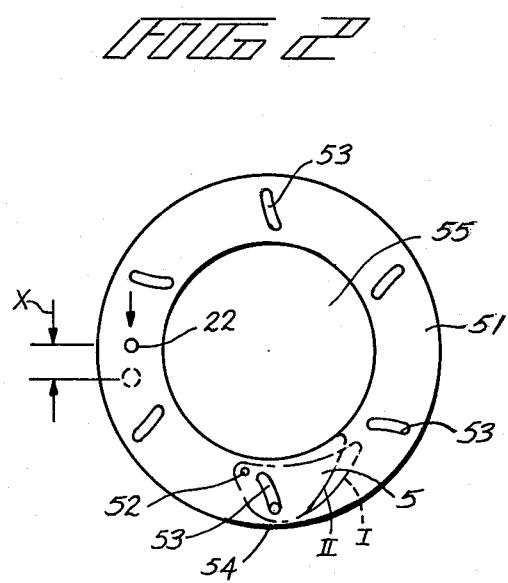

COMPENSATING MECHANISM FOR ZOOM LENS

BACKGROUND OF THE INVENTION

This invention relates to photographic cameras and, more particularly, to a mechanism for compensating and transmitting diaphragm values in an F-value variable zoom lens.

With the zoom lenses of various types in which the fully opened diaphragm value (generally referred to as F-value) of the lens is variable, not only the maximum aperture value, but also the aperture ratio, change as operation of zooming progresses. Application Ser. No. 229,879, filed Jan. 30, 1981, application Ser. No. 235,839, filed Feb. 19, 1981, and application Ser. No. 235,840, filed Feb. 19, 1981, are directed to automatic exposure control in a camera having interchangeable lenses, each having different maximum aperture values. The disclosures of these applications are incorporated fully herein by reference. In particular, application Ser. No. 235,839 discloses a system for accommodation of changes in lens characteristics by which a desired compensation is achieved by introducing a preliminary stroke, i.e., displacement, in the release operation that takes no part in the actual stop down process.

SUMMARY OF THE INVENTION

The present invention provides a novel and useful mechanism for practical compensation for changes in lens characteristics by introducing a preliminary stroke in a zoom lens. The mechanism and operation according to the present invention permit not only manual diaphragm control when the diaphragm has been preset in the camera body, but also automatic control when the diaphragm value has been set with priority and also compensation of errors in the display operatively associated with the diaphragm. The concept referred to hereby as the display operatively associated with the diaphragm includes the display of a shutter speed given in seconds when the diaphragm value has been selectively set with priority, the display of a diaphragm value when the shutter speed has been selectively set with priority, and the display of a diaphragm value for the program shutter.

Specifically, a zoom lens for a camera having automatic diaphragm control has an element for adjusting the focal distance of the lens, a displaceable actuator, a diaphragm variable between a maximum aperture value and a minimum aperture value responsive to displacement of the actuator, and an element for displacing the actuator upon shutter release. An element maintains the diaphragm at the maximum aperture value during an initial portion of the displacement of the actuator. Another element changes such initial portion responsive to the adjusting element to compensate for changes in lens characteristics as the focal length is adjusted. In this way, automatic diaphragm control can be practiced despite the fact that the lens characteristics change as the focal length of the zoom lens is adjusted.

BRIEF DESCRIPTION OF THE DRAWINGS

The features of a specific embodiment of the best mode contemplated of carrying out the invention are illustrated in the drawings, in which:

FIG. 1 is a perspective view of a compensating mechanism incorporating principles of the invention, including diaphragm stop down apparatus and apparatus for introducing changes in the initial stroke of the stop down apparatus;

FIG. 2 is a front view of part of a diaphragm incorporating principles of the invention.

DETAILED DESCRIPTION OF THE SPECIFIC EMBODIMENT

FIG. 1 shows the essential part of a zoom lens into which a mechanism according to the present invention is incorporated, together with a swing lever to which a force is transmitted from the camera body. Reference numeral 11 designates a movable, cylindrical frame on the zoom lens adapted to be translated within a zoom lens barrel along the optical axis, as indicated by an arrow a, in association with zooming, so as to vary the focal length of the lens. Movable frame 11 is provided with a compensating plate carrier ring 12 inserted therein. The outer edge of compensating plate carrier ring 12 slidably fits in an annular groove formed in the inner surface of movable frame 11 so ring 12 follows movable frame 11 as the latter moves along the optical axis in the direction of arrow a, but movable frame 11 is rotatable around the optical axis independently of compensating plate carrier ring 12. Thus, compensating plate carrier ring 12 is independent of, and does not follow, movable frame 11 as to rotation of movable frame 11. Reference numeral 13 designates a stopper compensating plate. Although this stopper compensating plate may be integral with compensating plate carrier ring 12, it is preferred for adjustment of its mounting position to provide stopper compensating plate 13 as a separate element and to fix to its front end compensating plate carrier ring 12 by clamping screws 14 as shown. Stopper compensating plate 13 extends towards a zoom lens mount (not shown) and is provided with a slit 13A longitudinally formed therein. A positioning lever 31 fixed to a stationary part of the zoom lens mount rides in slit 13A so that stopper compensating plate 13 moves back and forth in the direction of slit 13A as compensating plate carrier ring 12 moves back and forth. Reference numeral 13B designates a cam surface formed along the lower edge of stopper compensating plate 13, which serves to control a preliminary stroke of a stopper pin 23, as will be described in more detail later.

Reference numeral 21 designates a release lever pivotally mounted on a release lever shaft 32 which is, in turn, mounted on the stationary part of the zoom lens mount. Release lever 21 is normally biased, under action of a restoration spring 33 suspended between one arm thereof and the stationary part of the zoom lens mount, to rotate counterclockwise as viewed in the drawing. The restoring force of spring 33 acts upon release lever 21 in the direction to stop down the diaphragm blades. Release lever 21 is provided at its front end with a pair of holding pins 24, 24 fixed thereon to slidably receive therebetween a diaphragm rotating pin 22. Pin 22 is mounted on a diaphragm blade operating ring (not shown) so that diaphragm rotating pin 22 may be held between holding pins 24, 24 independently of the zooming operation. Stopper pin 23 is fixed on release lever 21 at the top of its front end and extends transversely of release lever 21 so that the upper surface of stopper pin 23 is located immediately under stopper compensating plate 13 and may be brought into contact with cam surface 13B. Reference numeral 41 designates a spring biased swing lever projecting from the camera body and adapted, when the zoom lens is mounted on the camera, to engage the top surface of the rear end of release lever 21. The clockwise rotational force exerted by swing lever 41 exceeds that exerted by spring 33. Thus, the rear end of release lever 21 in the lens is urged in the direction of an arrow b against the force of restoration spring 33 and thereby to urge stopper pin 23 against cam surface 13B of stopper compensating plate 13.

In the described mechanism according to the present invention, upon attaching the zoom lens to the camera body by means of the zoom lens mount, swing lever 41 urges the rear end of release lever 21 downwards and thereby brings stopper pin 23 into engagement with cam surface 13B. Upward movement of swing lever 41 in association with an operation, particularly the shutter release operation, causes release lever 21 to be rotated counterclockwise by the restoring force of spring 33. This rotation occurring around the release lever shaft 32 causes the front end of release lever 21 to move downwards so that diaphragm rotating pin 22 is also urged downwards, while being held between the holding pins 24, 24. After a movement along a certain preliminary stroke, pin 22 begins to stop the diaphragm blades down in the manner described, for example, below in FIG. 2; pin 22 could be fixed to the diaphragm blade actuating ring.

In FIG. 2, S designates one of the diaphragm blades, which together form an iris diaphragm, and 51 designates a diaphragm blade actuating ring, which rotates the diaphragm blades S around an associated pivot pin 52. Said diaphragm blade actuating ring 51 itself is adapted to be rotated around the optical axis with respect to a stationary part of the lens barrel. The numeral 53 designates a plurality of cam grooves formed in said diaphragm blade actuating ring 51 and a stationary pin 54 on each blade S is adapted to ride in each groove. The end of pin 22 is secured to the side of said diaphragm blade actuating ring 51. The diaphragm blade actuating ring 51 is biased by a spring (not shown) in the direction opposed to the direction indicated by an arrow in FIG. 2 so that said diaphragm blade actuating ring 51 normally tends to open the iris diaphragm toward its fully opened position. The position of pin 22, as illustrated, corresponds to the starting position of ring 51, at which each diaphragm blade S takes its position I indicated by broken lines. The inner edge of each diaphragm blade S is situated behind ring 51 so as not to protrude into a circular opening 55 in ring 51, which defines the maximum aperture of the lens. From this position, each diaphragm blade S is rotated around the respective pivot pin 52 with its associated pin 54 being guided along the associated cam groove 53 as pin 22 is urged downwardly in the direction indicated by the arrow and thereby the diaphragm blade actuating ring 51 is rotated until each diaphragm blade S reaches its position II indicated by phantom lines, at which its inner edge is brought into coincidence with the periphery of said circular opening 55. The position II of each blade S corresponds to the positions of blades of the fully opened diaphragm. Further rotation of the diaphragm blade actuating ring 51 actually begins to stop the lens down beyond the position II of each diaphragm blade S. Thus, during movement from the position I to the position II, the respective diaphragm blades S have no function of incident light quantity control and movement of pin 22 does not actually cause the diaphragm to stop down. The movement of pin 22 from the starting position to the position illustrated by phantom lines corresponds to the preliminary stroke, i.e., displacement.

Reference is also made to application Ser. No. 258,044, filed Apr. 28, 1981, now U.S. Pat. No. 4,360,275, the disclosure of which is incorporated fully herein by reference. As described in this referenced application, a control pulse generator produces pulses proportional in number to the displacement of a diaphragm aperture actuator. These pulses are stored in a counter, the count of which forms an actuator displacement representative signal. As described in application Ser. No. 235,839, there is formed a photometrically calculated aperture value signal that is compared with the actuator displacement representative signal. When the compared signals arrive at a prescribed relationship, the actuator displacement is stopped and the diaphragm stop down process is completed. With specific reference to FIG. 2, the diaphragm actuating ring is geared to the diaphragm control pulse generator. The number of pulses from the control pulse generator stored in the counter is representative of the angle through which the diaphragm actuating ring rotates and is compared with a photometrically calculated aperture value number. When the two numbers are equal, stop down of the diaphragm is arrested by actuating a diaphragm control magnet. Since the initial rotation of the diaphragm actuating ring, which corresponds to the initial stroke prescribed for the particular lens, does not result in any reduction of the aperture value, a number of the pulses stored in the counter do not correspond to actual reduction of aperture value, but instead correspond to the characteristics of the particular lens, thereby providing compensation for different lens characteristics from lens to lens.

The rotational displacement of diaphragm rotating pin 22 depends upon the angle through which the front end of release lever 21 is downwardly rotated and this angle depends, in turn, upon the point along the length of cam surface 13B of stopper compensating plate 13 at which the stopper pin 23 initially contacts cam surface 13B when swing lever 41 begins to move upwardly. The degree of such stopping down is directly determined by the position to which the compensating plate carrier ring 12 itself has been displaced in the direction of arrow a and is thus related to the movement of movable frame 11 along the optical axis as a result of zooming. Specifically, cam surface 13B presents a certain initial angle relative to the optical axis which defines a preliminary stroke for pin 22 and may sometimes be a curved surface and/or sloped straight surface, depending upon the lens characteristics. As shown, stopper pin 23 is given a relatively large preliminary stroke when stopper pin 23 contacts cam surface 13B at a position close to the rear end of stopper compensating plate 13. On the contrary, the preliminary stroke is relatively small when movable frame 11 has sufficiently retracted to bring stopper pin 23 into contact with cam surface 13B at a position close to the front end of stopper compensating plate 13.

Translation of movable frame 11 along the optical axis caused by the operation of zooming, as mentioned above, also causes compensating plate carrier ring 12 to be translated in the same direction and thereby causes stopper compensating plate 13 to move along slit 13A in the direction of the optical axis. As a result, the position at which cam surface 13B contacts stopper pin 23 changes, and thereby the preliminary stroke before initiation of stop down by release lever 21 is automatically adjusted in operative association with zooming. Thus, it is possible to compensate for changes in lens characteristics due to zooming by means of the preliminary stroke introduced into the movement of pin 22.

The mechanism according to the present invention, as described above, is adapted to achieve a desired compensation with an extremely simplified arrangement, so that such mechanism may contribute to exposure control and display with a high precision. Furthermore, because of its compact arrangement, the mechanism is useful when incorporated into a zoom lens having limited space.

What is claimed is:

1. In a zoom lens for a camera having automatic diaphragm control, the combination comprising:
   means for adjusting the focal distance of the lens;
   a displaceable actuator;
   a diaphragm variable between a maximum aperture value and a minimum aperture value responsive to displacement of the actuator;
   means for displacing the actuator upon shutter release;
   means for maintaining the diaphragm at the maximum aperture value during an initial portion of the displacement of the actuator and reducing the aperture value thereafter; and
   means responsive to the adjusting means for changing said initial portion to compensate for changes in lens characteristics as the focal length is adjusted.

2. The combination of claim 1, in which the adjusting means includes a translatable frame, the actuator includes a pivotal release lever coupled to the diaphragm, rotation of the release lever in a given direction reducing the aperture value, the displacing means includes means for biasing the release lever in the given direction, the changing means includes a stop to limit rotation of the release lever in a direction opposite to the given direction, releasable means for overcoming the biasing means to drive the release lever against the stop in opposition to the biasing means, and means responsive to the adjusting means for changing the position of the stop and thus the position of the release lever upon shutter release.

3. The combination of claim 2, in which the frame is translatable in the plane of rotation of the release lever, the stop comprises a cam elongated in the direction of translation of the frame and a cam follower secured to the release lever, the cam having a cam surface defining the changes to be made in said initial portion, and the means for moving the stop comprises means for coupling the cam to the frame so as to move without rotation in the plane of rotation of the release lever.

4. The combination of claim 3, in which the frame has a cylindrical inner surface aligned with the direction of translation of the frame and an annular groove formed in the inner surface and the coupling means comprises a ring having an outer edge that slidably fits in the annular groove, means for fixedly mounting the cam on the ring, a slot in the cam elongated in the direction of translation of the frame, and a fixed lever riding in the slot to prevent rotation of the ring.

* * * * *